United States Patent
Bodeau et al.

(10) Patent No.: US 7,082,019 B2
(45) Date of Patent: Jul. 25, 2006

(54) METHOD AND APPARATUS TO PROTECT SOLAR CELLS FROM ELECTROSTATIC DISCHARGE DAMAGE

(75) Inventors: John Michael Bodeau, Yorba Linda, CA (US); Philip L. Leung, La Canada, CA (US); Jesse Nerses Matossian, Woodland Hills, CA (US); Joel A. Schwartz, Glendale, CA (US)

(73) Assignee: The Boeing Company, Chicago, IL (US)

( * ) Notice: Subject to any disclaimer, the term of this patent is extended or adjusted under 35 U.S.C. 154(b) by 679 days.

(21) Appl. No.: 10/288,037

(22) Filed: Nov. 4, 2002

(65) Prior Publication Data

US 2004/0085692 A1    May 6, 2004

(51) Int. Cl.
    *H02H 3/18* (2006.01)
(52) U.S. Cl. ........................................... 361/82
(58) Field of Classification Search ............... 361/82
    See application file for complete search history.

(56) References Cited

U.S. PATENT DOCUMENTS

| | | | | |
|---|---|---|---|---|
| 3,280,333 A | * | 10/1966 | Thomas et al. | 250/214 SG |
| 4,367,365 A | * | 1/1983 | Spencer | 136/244 |
| 4,434,396 A | * | 2/1984 | Montague | 323/230 |
| 4,490,668 A | * | 12/1984 | Sterzer | 322/2 R |
| 5,223,044 A | * | 6/1993 | Asai | 136/255 |
| 5,330,584 A | * | 7/1994 | Saga et al. | 136/255 |
| 5,546,038 A | * | 8/1996 | Croft | 327/310 |
| 5,580,395 A | * | 12/1996 | Yoshioka et al. | 136/255 |
| 5,594,313 A | * | 1/1997 | Takeda | 320/166 |
| 5,616,185 A | * | 4/1997 | Kukulka | 136/244 |
| 5,620,528 A | * | 4/1997 | Schade et al. | 136/244 |
| 5,779,817 A | * | 7/1998 | Wecker | 136/244 |
| 5,986,354 A | * | 11/1999 | Nagao et al. | 307/64 |
| 6,087,991 A | * | 7/2000 | Kustas | 343/700 MS |
| 6,194,651 B1 | * | 2/2001 | Stark et al. | 136/256 |
| 6,243,243 B1 | * | 6/2001 | Gelderloos et al. | 361/56 |
| 6,331,670 B1 | * | 12/2001 | Takehara et al. | 136/244 |
| 6,384,313 B1 | * | 5/2002 | Nakagawa et al. | 136/244 |
| 6,395,971 B1 | * | 5/2002 | Bendel et al. | 136/244 |
| 6,515,215 B1 | * | 2/2003 | Mimura | 136/244 |
| 6,545,211 B1 | * | 4/2003 | Mimura | 136/244 |
| 6,635,507 B1 | * | 10/2003 | Boutros et al. | 438/57 |
| 6,946,752 B1 | * | 9/2005 | Tahara | 307/134 |

* cited by examiner

*Primary Examiner*—Brian Sircus
*Assistant Examiner*—James A. Demakis
(74) *Attorney, Agent, or Firm*—Shimokaji & Associates, P.C.

(57) ABSTRACT

Methods and apparatuses are disclosed for protecting solar cells from cellular degradation caused by an electrostatic discharge pulse. In one embodiment, a diode may bypass current generated from an electrostatic discharge so that the pulse current does not reverse bias the solar cell. Advanced diodes, capacitors and/or multiple diodes located on multiple bypass current paths, may be used. In another embodiment, the transient impedance of the current path that reverse biases the solar cell is increased by using inductors placed along the reversing current path. In another embodiment, the pulse current rise rate is reduced by extending the harness length of cell contacts. In another embodiment, solar cells in a serpentine pattern may be protected from electrostatic discharge damage by coupling bypass current paths to the open ends of the serpentine. Inductors may also be placed in series with the serpentine series of cells.

21 Claims, 8 Drawing Sheets

METHOD AND APPARATUS TO PROTECT SOLAR CELLS FROM ELECTROSTATIC DISCHARGE DAMAGE

BACKGROUND OF THE INVENTION

The present invention relates generally to apparatuses and methods for protecting solar cells and, more specifically to apparatuses and methods for protecting a solar cell from electrostatic discharge damage (ESD).

The interest in photovoltaic (PV) cells continues as concerns over pollution and limited resources continue. The continued interest has been in both terrestrial and non-terrestrial applications. In the non-terrestrial environment of outer space, the concern over limited resources of any type is a major one. This is because the need to increase the amount of a resource increases the weight. An increased weight can increase the cost of a launch more than linearly. With the ready availability of solar energy in outer space for a spacecraft, the conversion of solar energy into electrical energy has become a standard method of powering a spacecraft. Irrespective of the application, and as with any energy generation system, efforts have been ongoing into increasing the output and/or efficiency. One such effort has been the adoption use of multi-junction PV cells, such as triple junction GaAs cells, which convert sunlight to power with higher efficiency.

A problem with solar cells is the degradation and damage caused by reverse bias operation. Whenever solar cells are connected in a series array, shadowed or cracked solar cells may be subjected to reversed bias voltage and current. Cells that are operated in reverse bias may be permanently degraded by as little as a few percent in performance up to complete short-circuit failure [Rauschenbach, *Solar Cell Array Design Handbook*, 1980, Chapter 4–25]. It has become standard practice in solar array design to provide bypass diodes (also called shunt diodes) to protect cells from reverse bias degradation [Rauschenbach, chapter 6–27], and to perform reverse bias screening tests to weed out solar cells that could still degrade even with bypass diodes [see for example, Rosenberg and Gasner, "Reverse-Bias Screening of Large-Area GaAs/Ge Solar Cells at Low and High Temperatures", 23$^{rd}$ IEEE Photovoltaic Specialists Conference, 1993, pp 1421–5]. Research has shown that multijunction cells show increased tendency to degrade after exposure to reverse currents [see Yoo and Iles, "Effects of Reverse Bias on Multijunction Cells", 26$^{th}$ IEEE Photovoltaic Specialists Conference, 1997, p883–6]. The adoption of bypass diodes and reverse bias screening has become industry practice, and has led to satisfactory solar array performance.

Another problem with solar cell arrays is due to electrostatic discharge (ESD). Previously recognized ESD problems with solar cells involved the short circuiting of high voltage cellular arrays from high-energy electrostatic sustained vacuum arcs, powered by the energy output of the array, and triggered by differential charging of array dielectrics and structures. The short circuiting results from the electrical failure of the insulation materials between the solar cells and the conductive mechanical support structure. The results of this type of high-energy ESD are large sudden power losses caused by a permanent shunt.

Recently, another ESD problem has been discovered. Rather than large and sudden power losses occurring from high-energy ESD-initiated sustained vacuum arcs, gradual power losses resulting from moderate-energy ESD have been realized. The moderate-energy ESD causes large transient currents to flow through the cell array, which can cause large reverse currents and voltages to occur. Even with bypass diode protection, the transient reverse bias conditions can produce cellular level degradation of the cells. The repeated exposure to ESD slowly reduces the power output of the cells. A particular area of concern for moderate-energy ESD has been with multi-junction cells, such as GaAs, because of their greater sensitivity to reverse bias operation. Testing of multi-junction cells has shown that, as a result of ESD, a damaged multi-junction cell exhibits a lower maximum power and a degradation in fill factor. Fill factor degradation is typically caused by shunting across one of the junctions.

FIG. 1 is a diagram illustrating a prior art solar cell array 101. The solar cell array 101 comprises string series 102 of cells and serpentine series of cells 104, 106. The string series 102 of cells comprises a series of cells lined up in a single row. The negative terminals 102b of the string series may have a common negative terminal 105, while the positive terminals 102a of the string series may have a common positive terminal 103, or may be isolated by blocking diodes (not shown). The serpentine sections 104 and 106 are a series of solar cells that are connected in an S-like pattern. At the turns of the serpentine sections, a positive end 104b of one cell on one row is coupled to the negative end 104a of a cell on another row. Prior art arrays combine string series and serpentine series of cells to maximize the fraction of the array surface covered with solar cells.

FIG. 2 is a circuit diagram representing an ESD pulse 12 relative to a prior art solar cell 10. The ESD pulse 12 is represented as a current source having a current value IESD 14. The pulse current source 12 has positive 12a and negative 12b terminals. Typically, the ESD pulse current, IESD 14, may be 10's to 100's of amperes, and the duration of the ESD pulse may be microseconds to milliseconds. The solar cell 10 is part of a series of cells 17, and is also coupled to a load 100 and a ground 200. The solar cell 10 has positive 10a and negative 10b terminals. During normal operation, the series of cells may carry a cell current 15 from the cell 10 along current path 14b to the load 100, on the order of approximately 1 ampere, and each cell 10, 17 may generate a voltage, $V_{cell}$ 19 of approximately 2 volts.

Damage occurs to a solar cell 10 when the ESD current 14 exceeds the cell current 15 and flows in the opposite direction 14a. The ESD pulse 12 impacts the solar cell 10 when the switch 16 is closed, causing the ESD pulse 12 to generate reverse current 14 through current path 14a. The large reverse current 14 through the cell 10, reverses the polarity of the cell 10, so that $V_{18}$ 18 is greater than $V_{cell}$ 19. The large transient reverse current 14 can degrade and permanently damage the solar cell 10 similarly to the long duration reverse bias operation of shadowed or cracked cells.

Protection from these reverse bias conditions in prior art solar cell arrays has been achieved through the use of bypass diodes 30. These diodes 30 do not carry current under normal conditions when the cell voltage $V_{cell}$ 19, is greater than $V_{18}$ 18. When the cell 10 voltage is reversed, the bypass diodes 30 conduct most of the reverse current, 14c, which would otherwise damage the solar cell 10. But these diodes 30 are designed for the small steady-state current (less than 1 amp) of the solar cell string. Recent testing of solar cells with bypass diodes has shown that the large and fast transient ESD current pulse 12 results in a large reverse voltage and current 14 sufficient to damage some solar cells 10 at the cellular level. Damage occurs, in part, due to the slow response time of the bypass diode 30, which allows a fast ESD current pulse 14 to produce a large reverse voltage and current 14 overshoot across the solar cell 10. Damage also occurs because the reverse voltage and current 14 remaining after the bypass diode 30 has responded is still above the reverse current 14 level used to screen out solar cells 10 that are susceptible to reverse bias degradation.

As can be seen, there is a need for measures to reduce or prevent cellular level ESD. Over time, a cell can degrade to such a degree that it will no longer provide a sufficient amount of power. Moreover, the measures should work for various solar cell series circuits, such as serpentine and string configurations.

SUMMARY OF THE INVENTION

In one aspect of the present invention, a method for protecting a solar cell from damage caused by the reverse-biasing of the cell due to an electrostatic discharge may comprise increasing the transient impedance of the current path causing reverse biasing of the cell and directing electrostatic discharge current to a path that forward biases the cell. The transient impedance may be increased by coupling an inductor in series with the solar cell. In another aspect of the present invention, a method for protecting a solar cell from damage caused by the reverse biasing of the cell due to an electrostatic discharge comprises coupling a low transient impedance in parallel with the solar cell. The low transient impedance comprises an advanced, fast response and low forward voltage bypass diode in parallel with the solar cell, a discrete bypass capacitor in parallel with the solar cell, or a multitude of bypass diodes in parallel with the solar cell.

In a further aspect of the present invention, a method for protecting a series of solar cells having a serpentine circuit pattern from reverse-bias voltage produced by an electrostatic discharge comprises reducing the rate of the rise of an ESD current pulse (dI/dt). Reducing the rate of the rise of an ESD current pulse (dI/dt) may comprise coupling at least one bypass diode at an open end of the serpentine, coupling at least one capacitor at an open end of the serpentine, and/or coupling a discrete inductor in series with the serpentine.

In a yet further aspect of the present invention, an apparatus for protecting a solar cell from damage caused by the reverse-biasing of the cell due to an electrostatic discharge, comprises a first current path through which the solar cell is reverse biased, where the first current path has a transient impedance such that the rate of rise of electrostatic discharge damage (ESD) current is reduced, and a second current path where ESD current is bypassed. The first current path is a reverse path causing reverse biasing of said cell. The transient impedance may comprise an inductor, and may be coupled in series with the solar cell along the reverse path, plus the contact.

In an additional aspect of the present invention, an apparatus for protecting a solar cell from damage caused by the reverse biasing of the cell due to an electrostatic discharge may comprise a low, transient impedance coupled in parallel with the cell. The low, transient impedance may comprise a bypass diode, an advanced bypass diode, a multitude of diodes, a discrete bypass capacitor and/or an integral bypass capacitor.

In a still further aspect of the present invention, an apparatus for protecting a series of solar cells having a serpentine circuit pattern from reverse-bias voltage produced by an electrostatic discharge comprises a reducer for reducing the rate of the rise of an ESD current pulse (dI/dt). The reducer may comprise at least one bypass diode coupled at an open turn of the serpentine circuit, at least one capacitor coupled at an open turn of the serpentine circuit, and/or a discrete inductor in series with the series of cells.

In another aspect of the invention, an apparatus for protecting a solar cell from damage caused by the reverse biasing of the cell due to an electrostatic discharge may comprise a first inductor coupled to the positive terminal of the cell, a second inductor coupled to the negative terminal of the cell, an advanced diode coupled in parallel to the cell, and/or a capacitor coupled in parallel to the solar cell.

In still another aspect of the invention, an apparatus for protecting a series of solar cells used to power satellite functions, the series of cells having a serpentine circuit pattern, from reverse-bias voltage produced by an electrostatic discharge, may comprise an inductor coupled in series with the cells and a plurality of diodes coupled over the open turns of the serpentine pattern.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Improved apparatuses and methods are provided by the present invention that protects a solar cell from electrostatic discharge damage (ESD). In doing so, an electrostatic discharge pulse that may otherwise cause degradation of the power producing abilities of a solar cell is minimized. The present invention can be adapted to various solar array types, including string series and a serpentine series. The solar arrays are commonly used to power electrical devices on satellites. The electrical devices may include telemetry and communication systems. The solar array power output can be controlled by a power controller. While ESD commonly occurs in a satellite environment, the improved apparatuses and methods may also be used in other solar cell applications, such as, terrestrial power generation.

Figure 1:
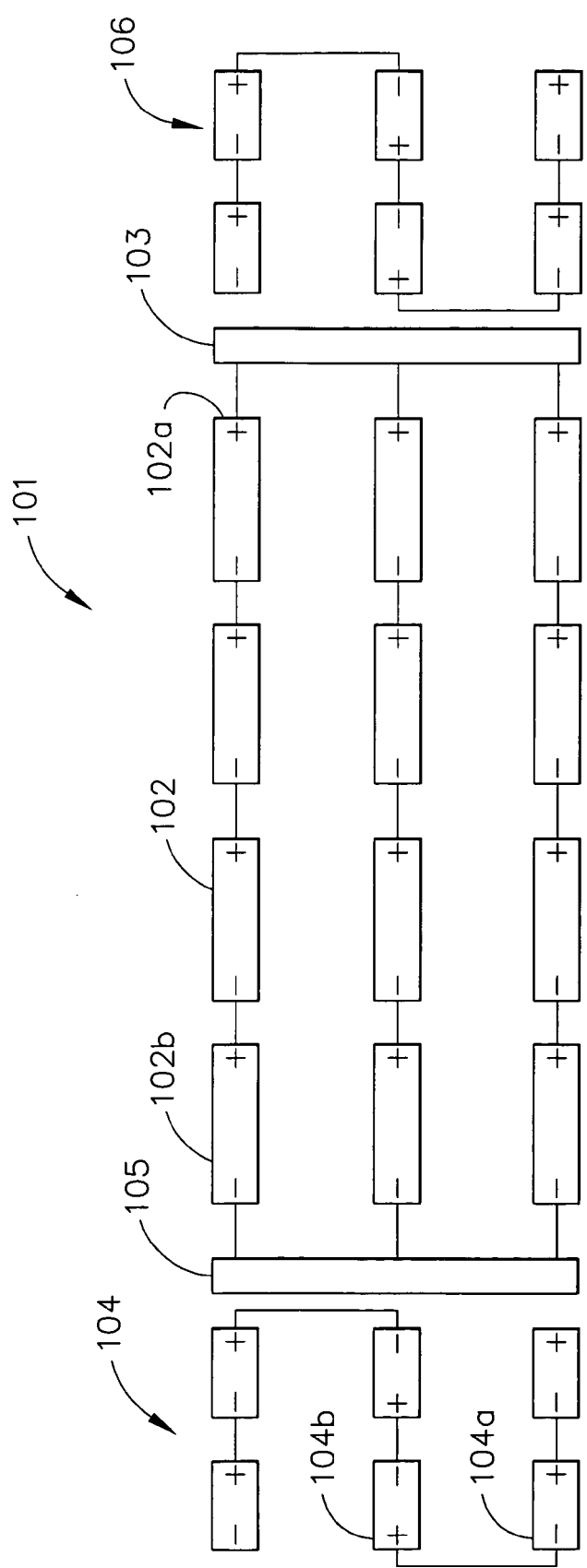
FIG. 1 is a diagram illustrating a prior art solar cell array.
Figure 2:
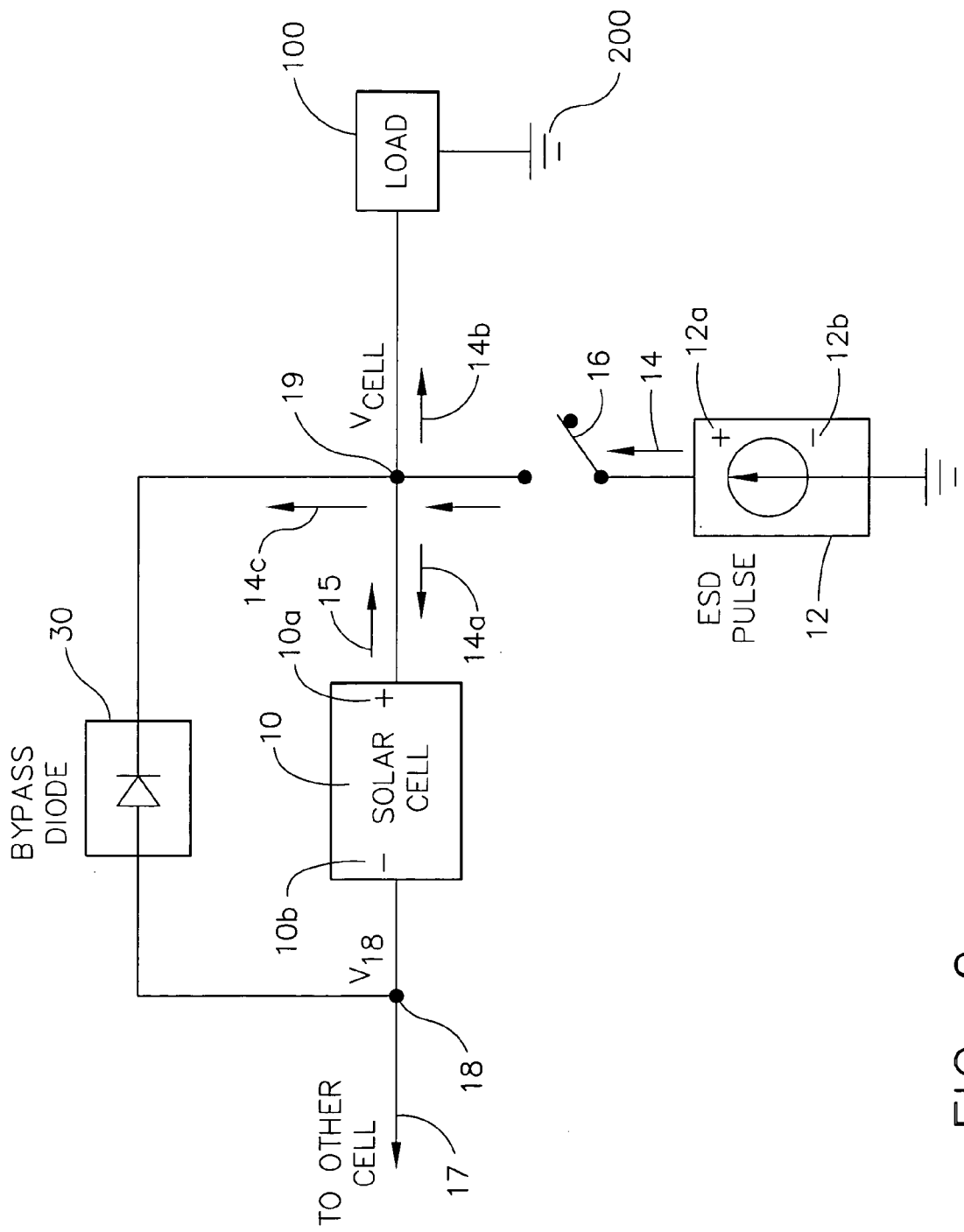
FIG. 2 is a circuit diagram representing an ESD pulse relative to a solar cell.
Figure 3:
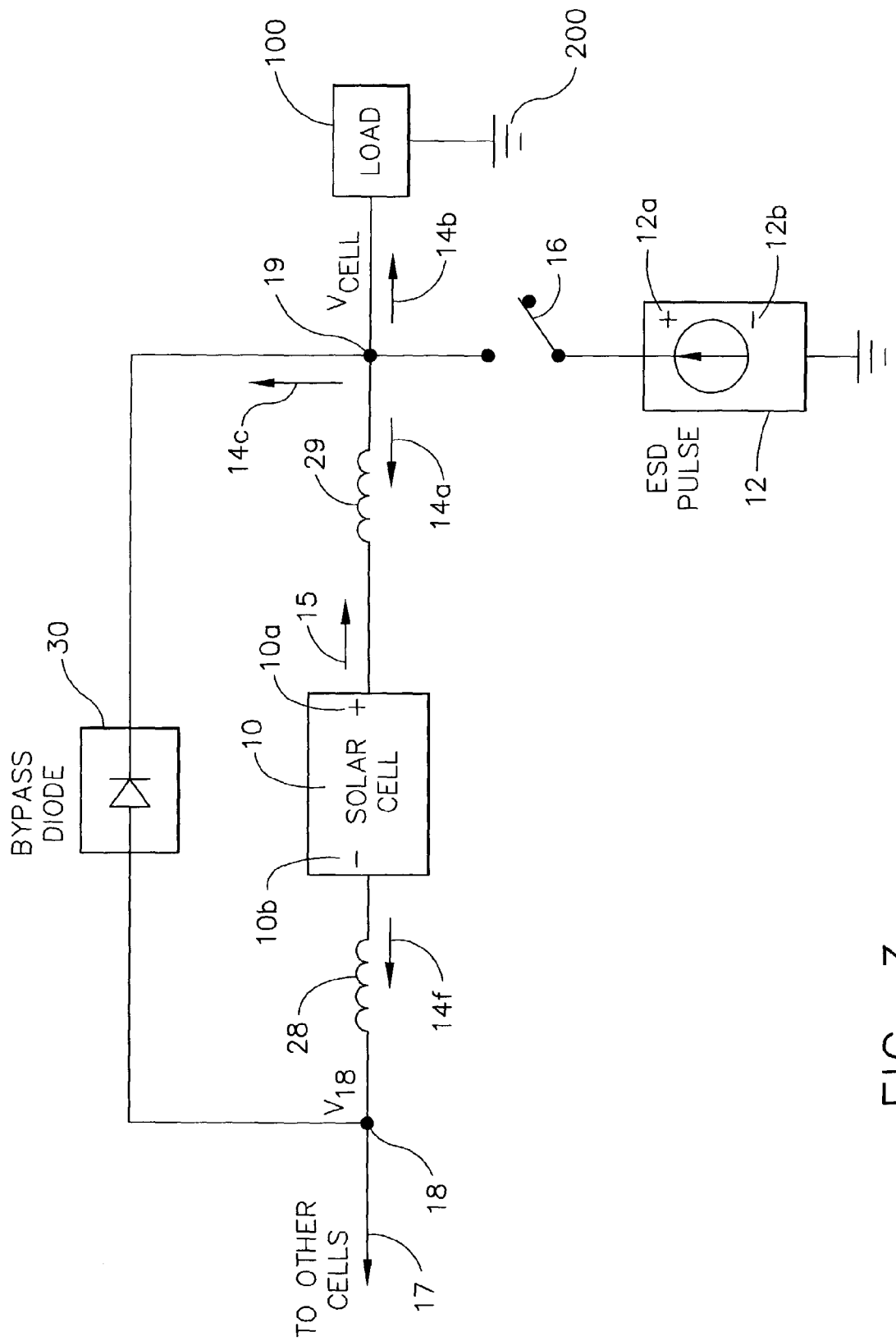
FIG. 3 is a circuit diagram illustrating inductors used for protecting a solar cell from an ESD pulse, according to one embodiment of the invention.

FIG. 3 is a circuit diagram illustrating one embodiment for protecting a solar cell 10 from an ESD pulse 12 using a first 28 and second 29 inductor in series with the cell 10. The ESD pulse 12 may produce an ESD pulse current 14. The ESD pulse 12 may cause ESD pulse current 14 to flow through current path 14a when the switch 16 is on.

First and second inductors 28, 29 may be placed in series with the solar cell 10. The first inductor 28 may be placed on the negative end 10b of cell 10 of the solar cell 10, while the second inductor 29 may be placed on the positive end of cell 10a. Either inductor 28 or 29 may be used individually or they may be used in combination, as shown in FIG. 3. When an inductor experiences an increase in current flow, the magnetic field in the inductor may increase causing the current flowing through to slow down, i.e. a transient impedance. The first 28 and second 29 inductors may increase the transient impedance of the reverse biasing current paths 14a and 14f of the cell 10 and, thus, the first inductor 28 and second 29 inductor may serve to block the fast transient current 14 produced by the ESD pulse 12 from passing through the cell 10 in reverse-biasing direction 14a and 14f. The first inductor 28 and the second inductor 29 may obstruct the ESD current 14 from reverse biasing current path 14a so that more current may flow through bypass current path 14c or is diverted to the load path 14b.

In one embodiment, a diode 30 may be disposed along bypass current path 14c. During normal operation of the solar cell 10, i.e. without the presence of an ESD pulse, the diode 30 may be reverse biased. When an ESD pulse is present, the diode 30 may be forward biased because $V_{18}$ 18 may be larger than $V_{cell}$ 19 and, thus, bypass current path 14c may be open. Each diode 30 may be integrally and/or discretely coupled to the solar cell 10. ESD current 14 is bypassed through current path 14c and through the diode 30 such that the amount of current that will flow down reverse bias current path 14a is reduced. A 50 microhenry first inductor or second inductor may reduce the peak ESD pulse current by 80%, and rate of increase of the current (dI/dt) by 80%, as examples.

Still referring to FIG. 3, in one embodiment, diode 30 may be an advanced diode. Recently, advanced bypass diodes have been developed that have a faster turn on time than previous diodes. A problem with previous diodes is that they may have a slow turn on time. ESD pulses may rise to peak values in under a microsecond and may last only milliseconds. This short pulse rise time may cause a quick rise in current such that a bypass diode 30 may not turn on in time and may not bypass the ESD pulse current 14. Advanced diodes may have a faster turn on time and thus may turn on quickly enough to provide a bypass current path 14c that will bypass the ESD pulse current 14. An example of an advanced diode is the fast signal diode manufactured by Microsemi Corporation of Santa Ana, Calif. Using advanced bypass diodes may reduce the peak ESD pulse current by 50% and reduce dI/dt by 40%, as examples.

Figure 3A:
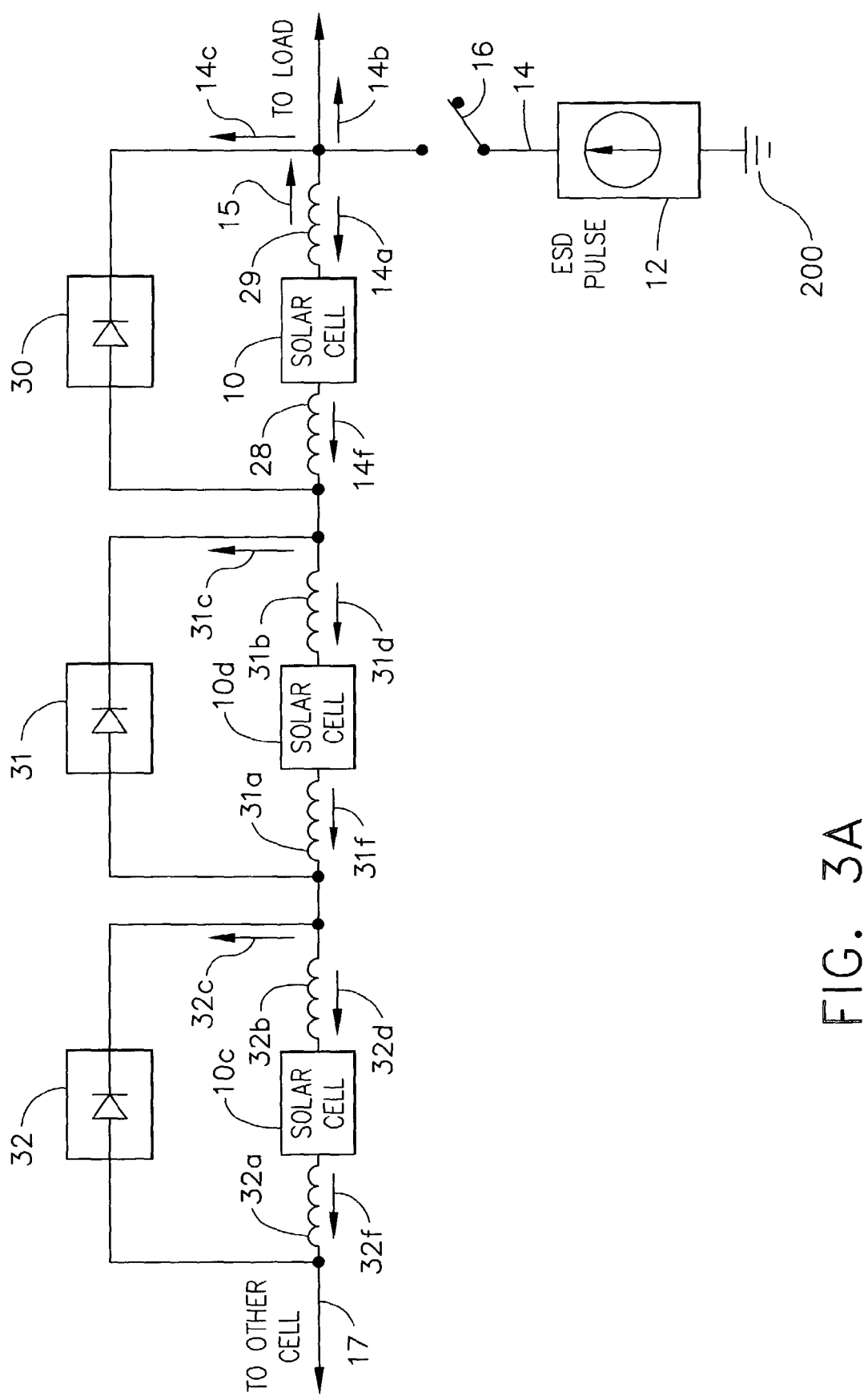
FIG. 3a is a diagram illustrating inductors used for protecting a series of cells, according to one embodiment of the invention.

FIG. 3a illustrates first inductor 28, second inductor 29, and inductors 31a, 31b, 32a, 32b used with a series of solar cells 10, 10d, and 10c, respectively. The reverse biasing current 14, which may be generated by the ESD pulse, travels along current path 14a from the ESD pulse. As shown previously, the current 14 may be bypassed along current path 14c that reduces the reverse bias of cell 10. Similarly for cells 10d and 10c, the ESD current 14 may be bypassed along current paths 31c and 32c to reduce the reverse bias of cells 10c and 10d because inductors 31a, 31b and 32a, 32b may increase the impedance along current paths 31d, 31f and 32d 32f, respectively. Thus, each solar cell 10, 10c, 10d in the series may be protected.

Figure 4:
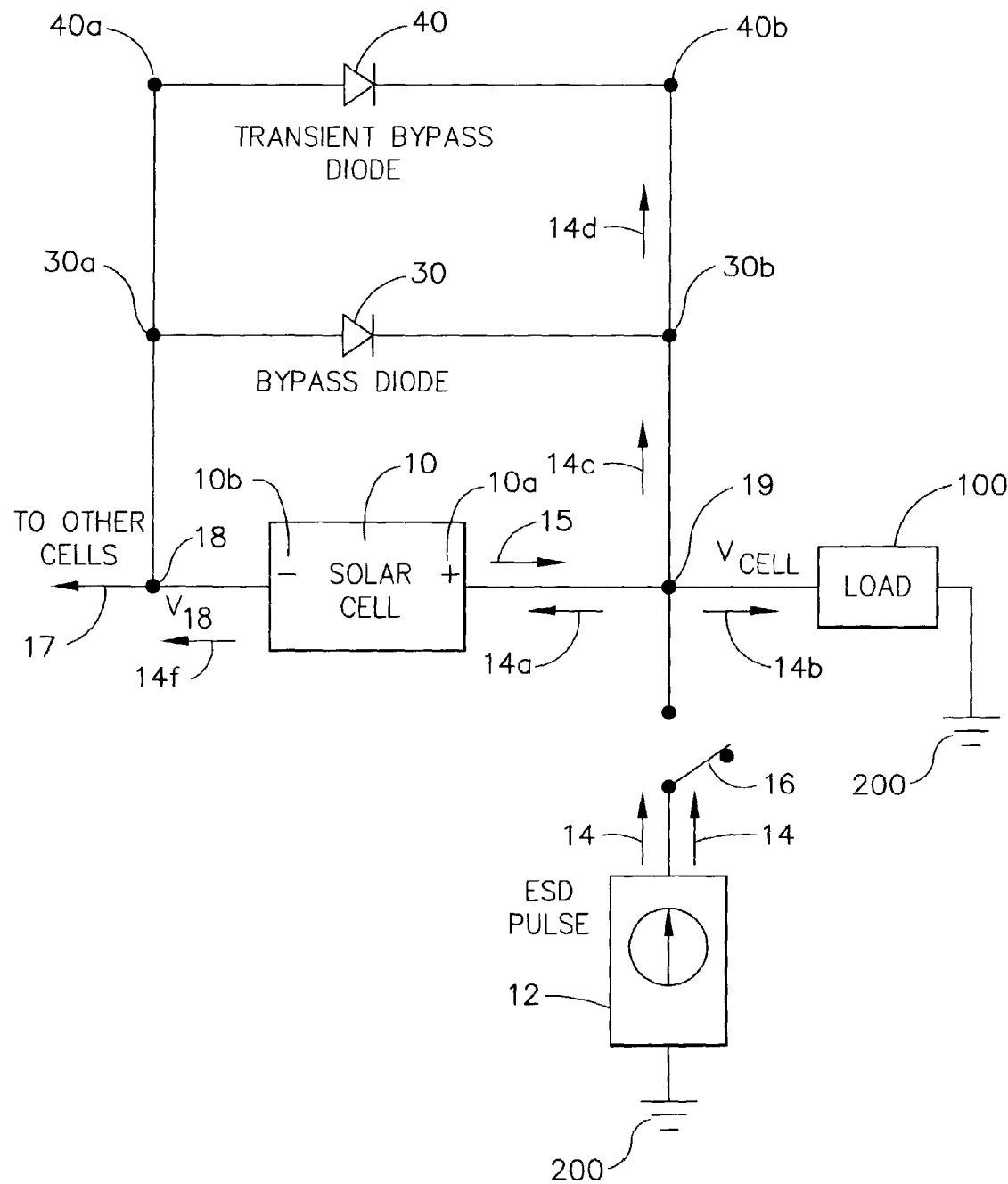
FIG. 4 is a diagram illustrating a solar cell protected from ESD by using diodes in parallel with the cell, according to one embodiment of the invention.

FIG. 4 is a diagram illustrating another embodiment for protecting a solar cell 10 from ESD by reducing the peak current and dI/dt of the ESD pulse current 14a, relative to the solar cell 10, using a series of diodes 30, 40 in parallel with the solar cell 10. A pair of diodes 30, 40 are shown in parallel with solar cell 10. The diodes 30, 40 may be disposed on bypass current paths 14c and 14d. When there is no ESD pulse 12 present, the diodes 30, 40 may be biased such that no current flows through paths 14c and 14d. When there is an ESD pulse 12, switch 16 closes and the voltage $V_{18}$ 18 at nodes 30a, 40a may be greater than the voltage $V_{cell}$ 19 at nodes 30b and 40b. Diodes 30 and 40 may turn on and the ESD pulse current 14 may be bypassed through bypass current paths 14c and 14d. Where bypass diode 40 is a fast transient bypass diode, and bypass diode 30 is a traditional diode, the fast bypass diode 40 may reduce the peak of reverse biasing current 14a, and the power dissipated in solar cell 10 before traditional bypass diode 30 turns on. After the traditional bypass diode 30 turns on, the current path 14c allows more of the ESD pulse current 14 to be bypassed.

Figure 5:
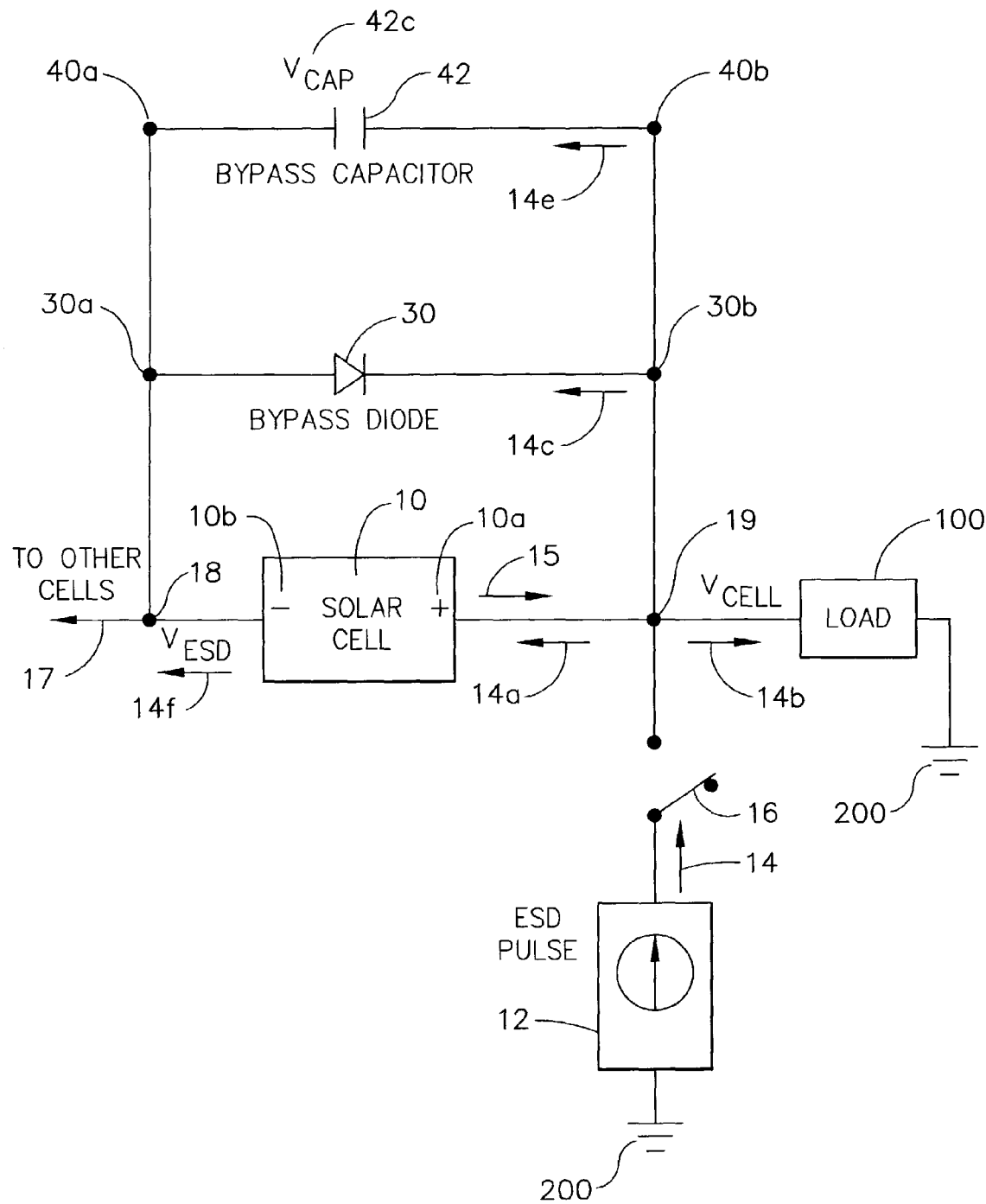
FIG. 5 is a diagram illustrating a solar cell protected from ESD using a capacitor in parallel with the solar cell, according to one embodiment of the invention.

FIG. 5 is a diagram illustrating yet another embodiment for protecting a solar cell from ESD using a capacitor 42 in parallel with the solar cell 10. The capacitor 42 may be placed in parallel with the cell 10. The capacitor 42 may be used in conjunction with a bypass diode 30, or fast transient bypass diode (not shown). When the ESD pulse 12 is not present, the voltage of the capacitor $V_{cap}$ 42b may be equal to the voltage $V_{cell}$ 19 of the solar cell 10 and thus no current flows through current path 14e. When the ESD pulse 12 is present, $V_{ESD}$ 18 may rise above $V_{cell}$ 19, as will $V_{cap}$ 42b in response to ESD current pulse 14. The ESD pulse current 14 flows through bypass current path 14e because the transient impedance of the capacitor 42 to transient current flow is low. When the capacitor 42 is used with bypass diode 30, the capacitor may bypass pulse current flow 14 that does not flow down bypass current path 14c.

Prior research, as discussed in "Amplitude Scaling of Solar Array Discharges", IEEE Transactions On Nuclear Science. Vol. 37. No. 6. December, 1990, and "The Effects of Conducting Breaks on Electrostatic Discharges (ESDs) on Optical Solar Reflector (OSR) Panels", IEEE Transactions On Nuclear Science. Vol. 39. No. 6. December, 1992 and herein incorporated in their entirety, has shown that the shape of an ESD pulse is governed by the physical shape of the ESD source. Specifically, the peak current is determined by the narrow dimension and the pulse width is determined by the long dimension. Serpentine patterned circuits typically have a length to width ratio close to one, while series linear circuits have length to width ratios much greater than one. Thus, a serpentine may have a much higher peak ESD pulse current and a narrow pulse width that may cause larger reverse bias voltage and current overshoots as compared to a linear string series of cells.

Figure 6:
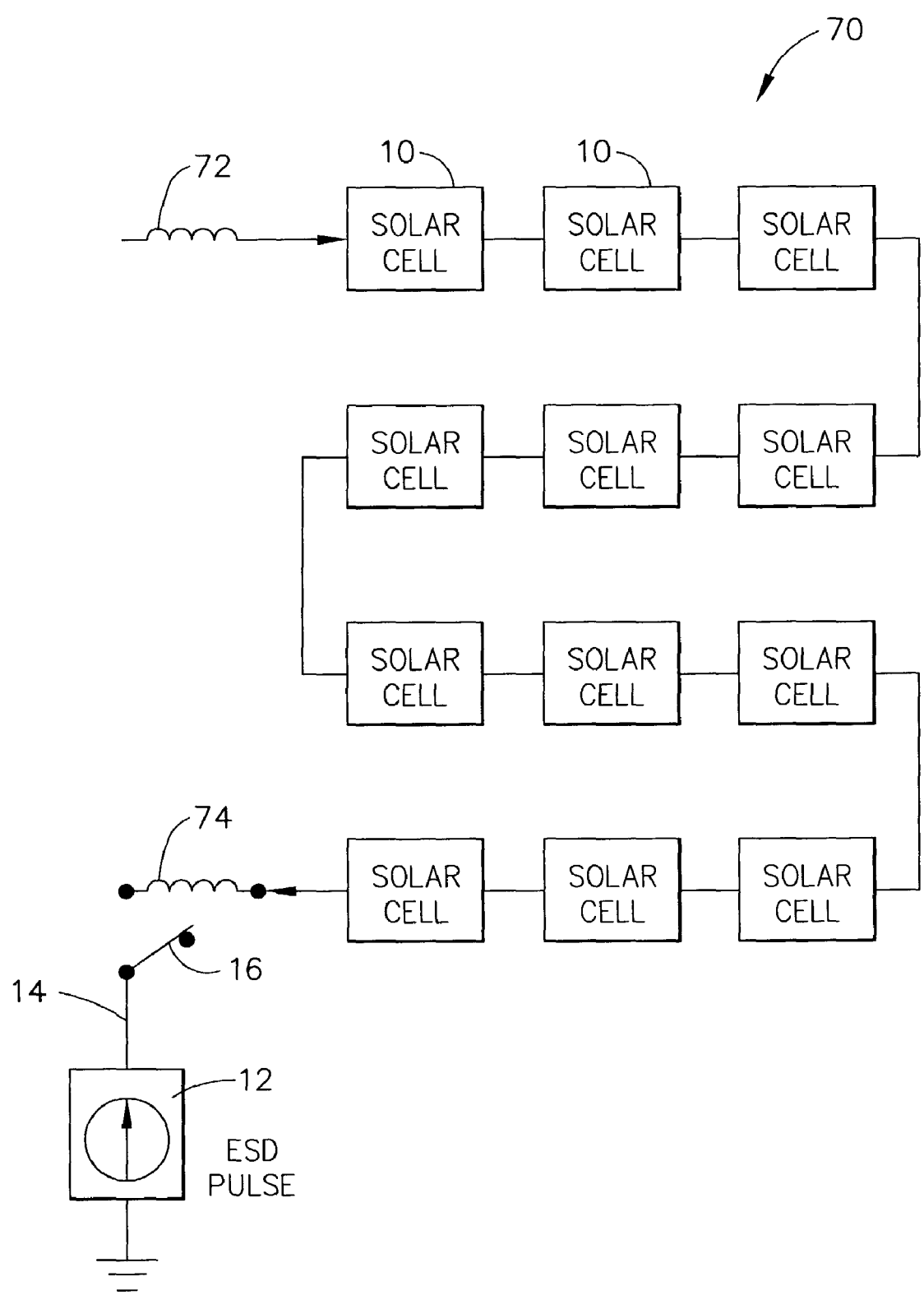
FIG. 6 is a diagram illustrating a solar cell array having a serpentine circuit pattern, protected from ESD, using inductors coupled in series with the cells in the array, according to one embodiment of the invention.

FIG. 6 is a diagram illustrating one embodiment for protecting a solar cell array 70 having a serpentine circuit pattern from ESD, using inductors 72, 74 coupled in series with the solar cells 10. Each inductor 72, 74 may readily pass the steady DC current generated by the solar cells 10. The ESD pulse 12 may produce a fast transient current 14. The inductors 72, 74 have a high transient impedance and may block the fast transient current 14 and may prevent reverse biasing of the solar cells 10.

Figure 7:
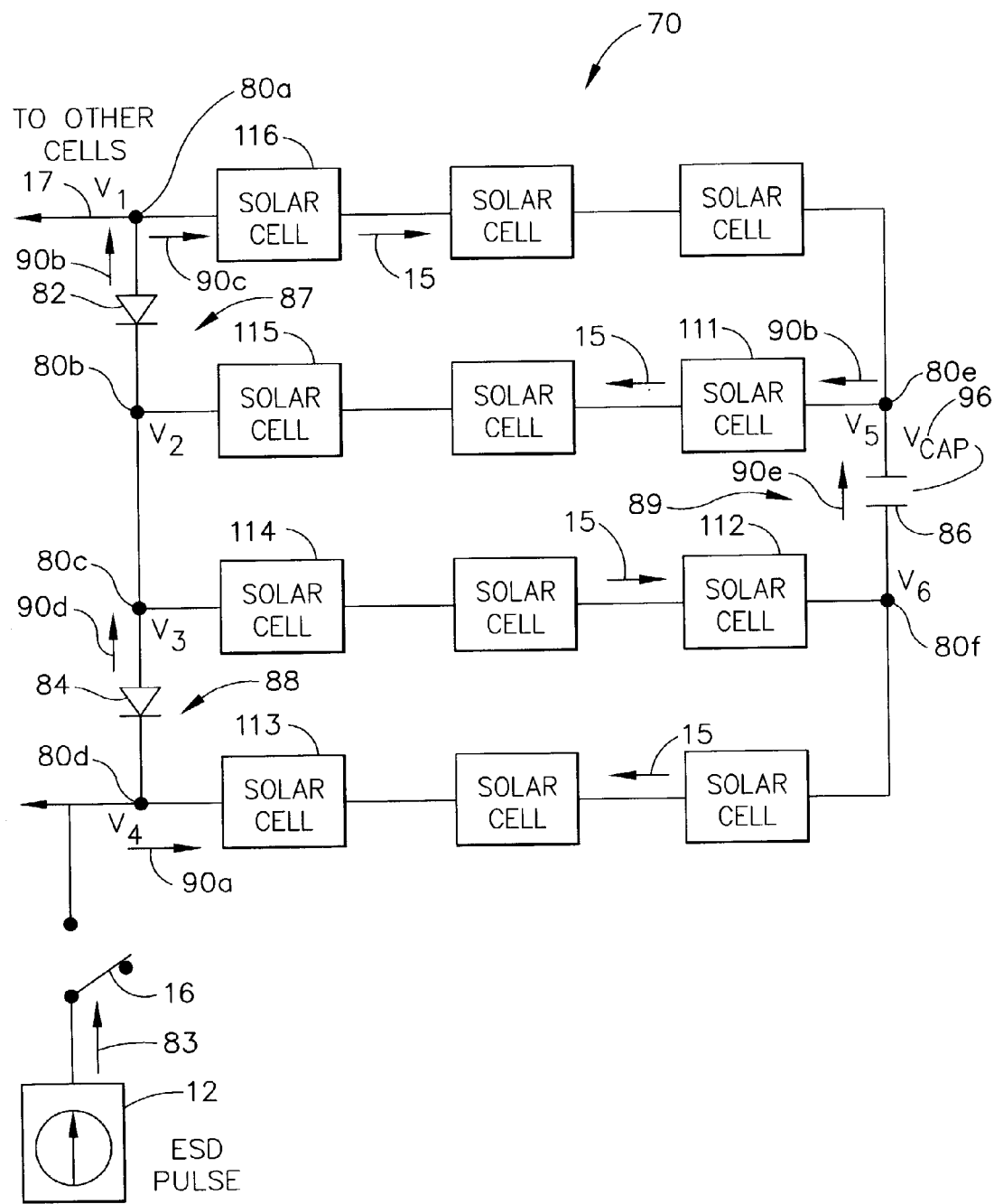
FIG. 7 is a diagram illustrating two embodiments according to the invention for protecting a serpentined patterned solar cell from ESD pulse using bypass diodes and capacitors.

FIG. 7 is a diagram illustrating two embodiments for protecting a serpentined patterned solar cell 70 from an ESD pulse 12 using bypass diodes 82, 84 and capacitor 86. In one embodiment, bypass diodes 82, 84 may be placed across the open ends 87, 88 of the serpentine turns. Under normal conditions, $V_2$ 80b is greater than $V_1$ 80a and diode 82 is reverse biased and does not pass array current 15 down current path 90b. Likewise, $V_4$ 80d is greater than $V_3$ 80c and diode 84 is reverse biased and does not pass the array current 15. When an ESD pulse 12 is present, the ESD pulse current 83 that may be generated by the ESD pulse 12 may travel from the current source 12 through current path 90a if diodes 82 and 84 were not present. The ESD pulse current 83 may cause voltage $V_3$ 80c to be greater than $V_4$ 80d and voltage $V_1$ 80a to be greater than $V_2$ 80b, creating reverse voltages across the cells 113, 114 and 115, 116 between the open ends 87, 88 of the serpentine turns, respectively. When the ESD pulse 12 is present, diode 82 may turn on and may shunt the ESD pulse current 83 down current path 90b, and diode 84 may turn on and may shunt the ESD current 83 down current path 90d. Diodes 82 and 84 may divide the ESD pulse current 83 across multiple current paths over the serpentine solar cell array 70 such that each solar cell 10 in the serpentine solar cell array 70 may receive only a small portion of the ESD pulse current 83.

In another embodiment, a capacitor 86 may be placed across an open end 89 of the serpentine turns. Under normal conditions, capacitor 86 has a very high impedance to steady state currents and passes none of the array current 15. $V_6$ 80f is greater than $V_5$ 80e and $V_{cap}$ 96 is equal to the difference in voltages, $V_6$ 80f minus $V_5$ 80e. When an ESD pulse 83 is present, the reverse biasing current 83 flowing through the serpentine 70, may cause $V_5$ 80e to exceed $V_6$ 80e, creating a reverse voltage across cells 111 and 112, and between the open end 89 of the serpentine turn if the capacitor 86 was not present. The low transient impedance of the capacitor 86 provides a bypass path, 90e, for current to flow, thus reducing the ESD current 83 that would reverse bias the cells 111, 112 between the open end 89 of the serpentine 70. The capacitor 86 may also slow and reduce the change in reverse voltage, reducing the power dissipated by the cells in the array 70. Just as with the diode embodiment above, a multitude of capacitors may be coupled over the open ends of the serpentine to bypass ESD pulse current 83.

It should be understood, of course, that the foregoing relates to preferred embodiments of the invention and that modifications may be made without departing from the spirit and scope of the invention as set forth in the following claims.

We claim:

1. A method for protecting a solar cell from damage caused by the reverse-biasing of the cell due to an electrostatic discharge, comprising:
    coupling an inductor in series with said cell;
    coupling a bypass diode in parallel with said cell; and
    coupling a bypass capacitor in parallel with said cell.

2. The method of claim 1, where said step of coupling a bypass diode in parallel with said cell comprises:
    coupling a discrete diode in parallel with said cell.

3. The method of claim 1, where said step of coupling a bypass diode in parallel with said cell comprises:
    coupling an integral diode in parallel with said cell.

4. The method of claim 1 further comprising:
    coupling a multitude of bypass diodes in parallel with said cell.

5. The method of claim 1 where said step of coupling a bypass diode in parallel with said cell comprises:
    coupling an advanced bypass diode in parallel with said cell.

6. A method for protecting a series of solar cells having a serpentine pattern from reverse-biasing current produced by an electrostatic discharge damage (ESD) current pulse, comprising:
    reducing a rate of a rise (dl/dt) and peak current of said ESD current pulse by:
        coupling a discrete inductor in series with said series of cells;
        coupling at least one bypass diode at an open turn of said serpentine pattern;
        coupling at least one capacitor at a turn of said serpentine pattern.

7. An apparatus for protecting a solar cell from damage caused by the reverse-biasing of the cell due to an electrostatic discharge, comprising:
    an inductor coupled in series with said cell;
    a bypass diode coupled in parallel with said cell; and
    a bypass capacitor coupled in parallel with said cell.

8. The apparatus of claim 7 wherein said bypass diode comprises an advanced bypass diode.

9. The apparatus of claim 7 wherein said bypass capacitor comprises a discrete bypass capacitor.

10. The apparatus of claim 7 wherein said further comprising a multitude of diodes coupled in parallel with said cell.

11. An apparatus for protecting a series of solar cells having a serpentine circuit pattern from reverse-biasing current produced by an electrostatic discharge damage (ESD) current pulse, comprising:
    a discrete inductor coupled in series with said series of solar cells;
    at least one bypass diode coupled at an open turn of said serpentine circuit pattern; and
    at least one capacitor coupled at an open turn of said serpentine circuit pattern.

12. An apparatus for protecting a solar cell from damage caused by the reverse-biasing of the cell due to an electrostatic discharge, comprising:
    a first inductor coupled to a positive terminal of said cell;
    a second inductor coupled to a negative terminal of said cell;
    an advanced diode coupled in parallel to said cell; and
    a capacitor coupled in parallel to said cell.

13. An apparatus for protecting a series of solar cells used to power satellite functions, said series of cells having a serpentine circuit pattern, said protection from reverse-bias voltage produced by an electrostatic discharge, comprising:
    an inductor coupled in series with said cells;
    a plurality of diodes coupled over open turns of said serpentine circuit pattern; and
    at least one capacitor coupled at an open turn of said serpentine circuit pattern.

14. A solar cell system comprising:
    a solar cell;
    a first current path through which said cell is reverse biased, said current path having a transient impedance such that a rate of rise and peak of electrostatic discharge damage (ESD) current is reduced;
    an inductor coupled in series with said cell and along said first current path;
    a second current path in parallel with said first path wherein said ESD current is bypassed;
    a bypass diode is disposed along said second current path; and a bypass capacitor disposed along said second current path.

15. The system of claim 14 wherein the bypass diode comprises an advanced bypass diode.

16. The system of claim 14 wherein the bypass capacitor comprises a discrete bypass capacitor.

17. The system of claim 14 further comprising:
a third current path in parallel with said first current path and having a diode disposed along said third current path.

18. The system of claim 14 further comprising:
a reducer coupled with a serpentine patterned portion of a solar cell array in which said cell is disposed, said reducer for reducing a rate of a rise (dI/dt) and peak of said ESD pulse current.

19. The system of claim 18 wherein said reducer comprises:
at least one bypass diode coupled at an open turn of said serpentine circuit pattern.

20. The system of claim 18 wherein said reducer comprises:
at least one capacitor coupled at an open turn of said serpentine patterned portion.

21. The system of claim 18 wherein said reducer comprises:
a discrete inductor in series with said serpentine patterned portion.

* * * * *